United States Patent [19]

Reid

[11] E Re. 29,362

[45] Reissued Aug. 23, 1977

[54] PACKAGING APPARATUS

[75] Inventor: Laurie M. Reid, Birmingham, Ala.

[73] Assignee: Anderson Bros. Mfg. Co., Rockford, Ill.

[21] Appl. No.: 700,797

[22] Filed: June 29, 1976

Related U.S. Patent Documents

Reissue of:

[64] Patent No.: 3,927,507
Issued: Dec. 23, 1975
Appl. No.: 435,731
Filed: Jan. 23, 1974

[51] Int. Cl.[2] ..... B65B 11/10; B65B 13/04; B65B 51/14

[52] U.S. Cl. ..... 53/198 R; 53/182 R; 53/228; 53/232; 74/242.11 R; 198/858

[58] Field of Search ..... 53/198 R, 228, 229, 53/232, 180, 182, 29; 74/242.11 R, 242.11 C; 156/575; 198/858

[56] References Cited

U.S. PATENT DOCUMENTS

| | | | |
|---|---|---|---|
| 2,584,447 | 2/1952 | Hayot | 74/242.11 R X |
| 2,944,456 | 7/1960 | Christiansen et al. | 83/419 X |
| 3,015,601 | 1/1962 | Fener | 156/515 |
| 3,158,973 | 12/1964 | Monaghan | 53/182 X |
| 3,191,356 | 6/1965 | Zelnick et al. | 53/182 |
| 3,564,810 | 2/1971 | Faletti et al. | 53/198 R X |

*Primary Examiner*—Othell M. Simpson
*Assistant Examiner*—Horace M. Culver
*Attorney, Agent, or Firm*—Morsbach & Pillote

[57] ABSTRACT

Packaging apparatus in which units to be wrapped and flexible packaging material for wrapping the units are fed forward with the units spaced apart in the direction of feed, with a dwell interval between successive feed cycles, and having means for forming a seal across the width of the material between two successive units during each dwell interval. The units are fed forward by conveyor means intermittently driven via a chain and sprocket drive including a crank rotatable about a predetermined axis, means for continuously rotating the crank in one direction about its said axis, a first sprocket secured to the crank with the axis of the first sprocket offset from the crank axis for rotation of the first sprocket about the crank axis without rotation of said first sprocket about its own axis, a second sprocket and a chain trained around said first and second sprockets. The sealing means is operated during the dwell intervals by a similar chain and sprocket drive mechanism.

9 Claims, 14 Drawing Figures

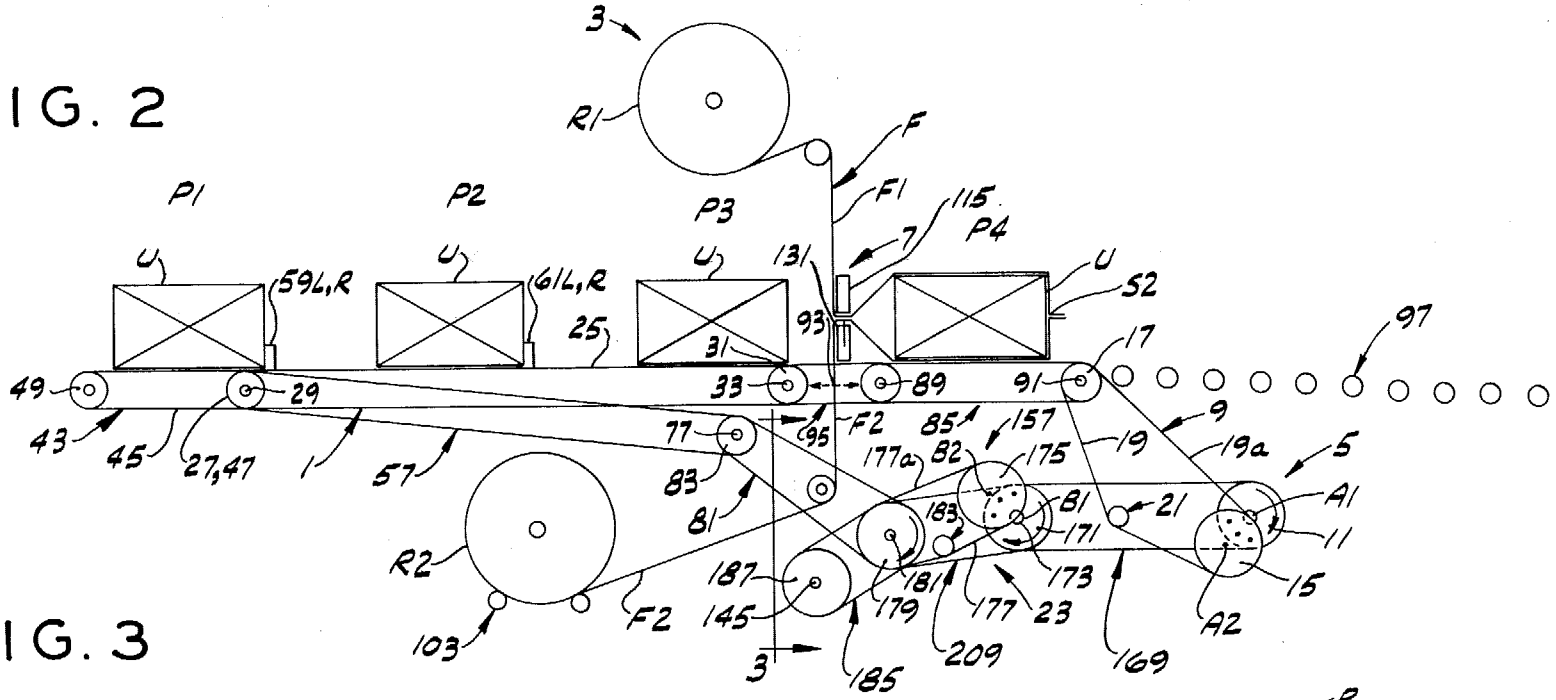
FIG. 2
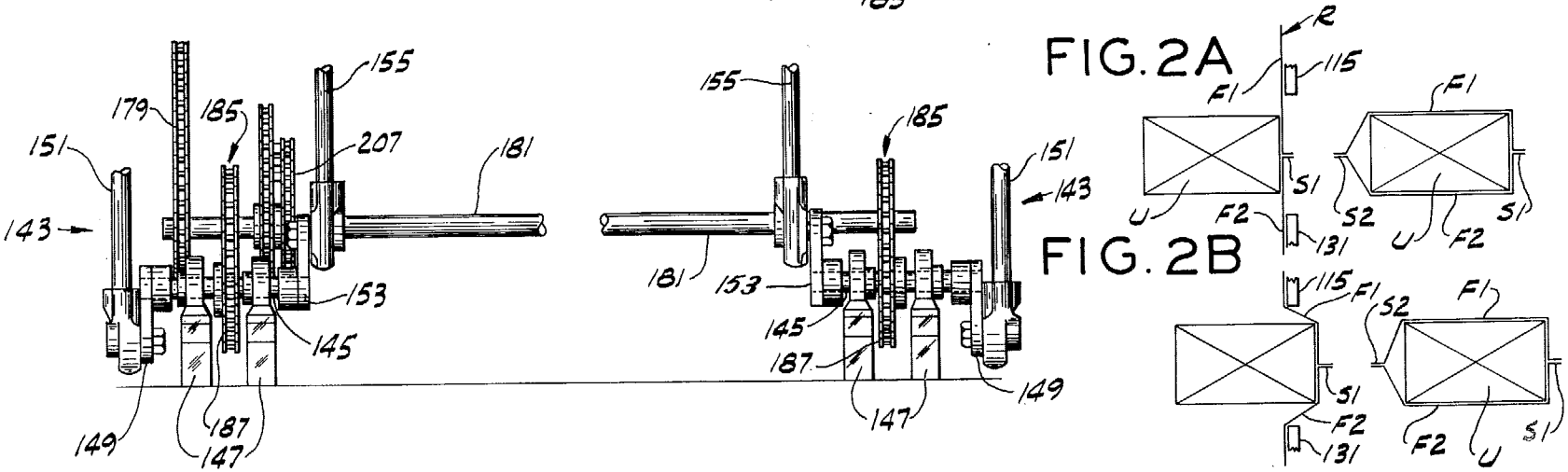
FIG. 3
FIG. 2A
FIG. 2B

PACKAGING APPARATUS

Matter enclosed in heavy brackets [ ] appears in the original patent but forms no part of this reissue specification; matter printed in italics indicates the additions made by reissue.

BACKGROUND OF THE INVENTION

This invention relates to packaging apparatus, and more particularly to apparatus for wrapping products in heat-shrinkable film for subsequent shrinking in a shrink tunnel.

The invention is especially concerned with apparatus of a type heretofore sold by the assignee of this application known as a "sleeve wrapper," in which a unit to be wrapped is fed forward by a conveyor against a vertical reach of film comprising a first web issuing from an upper roll and extending downwardly and a second web issuing from a lower roll and extending upwardly with the ends of the two webs heat-sealed together. As the unit moves forward, the upper web is draped over the unit and the lower web is draped under it. The unit then dwells in place while a pair of seal bars are closed behind the unit to heat-seal the two webs together on the trailing side of the unit and to sever the webs through the seal so as to provide a trailing seal for the film draped around the unit to form a sleeve, and a seal constituting the leading seal for the next sealing operation. After the sealing operation, the bars are opened and the enwrapped unit is fed forward away from the webs and another unit fed forward for being wrapped.

In the assignee's prior sleeve wrapping apparatus, the conveyor (and seal bars) have been intermittently operated in sealing cycles via start-and-stop electric motor operation under control of a photoelectric cell and this has tended to cause problems when attempting to wrap units of low stability, at commercially necessary speeds, the acceleration and deceleration characteristics of this type of operation being such as to tend to cause units of low stability to tip over and/or to become disoriented on starting and stopping the conveyor.

SUMMARY OF THE INVENTION

Accordingly, among the several objects of the invention may be noted the provision of an improved wrapping apparatus of the class described wherein the starting and stopping of the conveyor is so smooth as to enable handling of units of relatively low stability (e.g., filled bags) without the units tipping over or becoming disoriented while wrapping the units at commercially necessary speeds (e.g., up to 30–40 cycles per minute); the provision of such apparatus having means for correlating the operation of the conveyor and the seal bars with acceleration and deceleration characteristics such as provide smooth operation; the provision of such apparatus having continuously operating means for this purpose, as distinguished from on-off operation; and the provision of such apparatus which has increased life, lower maintenance and more reliable operation (on account of smooth operation).

In general, packaging apparatus of this invention comprises means for feeding forward units to be wrapped and flexible packaging material for wrapping the units, with the units spaced apart in the direction of feed, means for effecting intermittent operation of the feeding means intermittently to feed forward the units and the packaging material, with a dwell interval between successive feed cycles, and means for forming a seal across the width of the material between two successive units during each dwell interval. The means for operating the feeding means comprises a chain and sprocket drive including a crank rotatable about a predetermined axis, means for continuously rotating the crank in one direction about its said axis, a first sprocket secured to the crank with the axis of said first sprocket offset from the crank axis for rotation of said first sprockets about the crank axis without rotation of said first sprocket about its own axis, a second sprocket, a chain trained around said first and second srockets, said first sprocket acting to pull a reach of the chain in a forward direction to effect rotation of the second sprocket in a forward direction for driving said feed means during a portion of a revolution of said first sprocket about the crank axis, and to discontinue forward drive of the chain during another portion of said revolution for a feed and dwell of the feed means during each revolution of the crank, and means for maintaining the chain relatively taut around said sprockets.

Other objects and features will be in part apparent and in part pointed out hereinafter.

BRIEF DESCRIPTION OF THE DRAWINGS

FIG. 2 is a semidiagrammatic view illustrating certain conveyors and drives of the apparatus;

FIGS. 2A and 2B are views based on FIG. 2 and showing moved positions of the units;

FIG. 3 is a view taken generally on line 3—3 of FIG. 2, on a much larger scale than FIG. 2, illustrating certain drive components of the apparatus;

Corresponding reference characters indicate corresponding parts throughout the several views of the drawings.

DESCRIPTION OF THE PREFERRED EMBODIMENT

Figure 1:
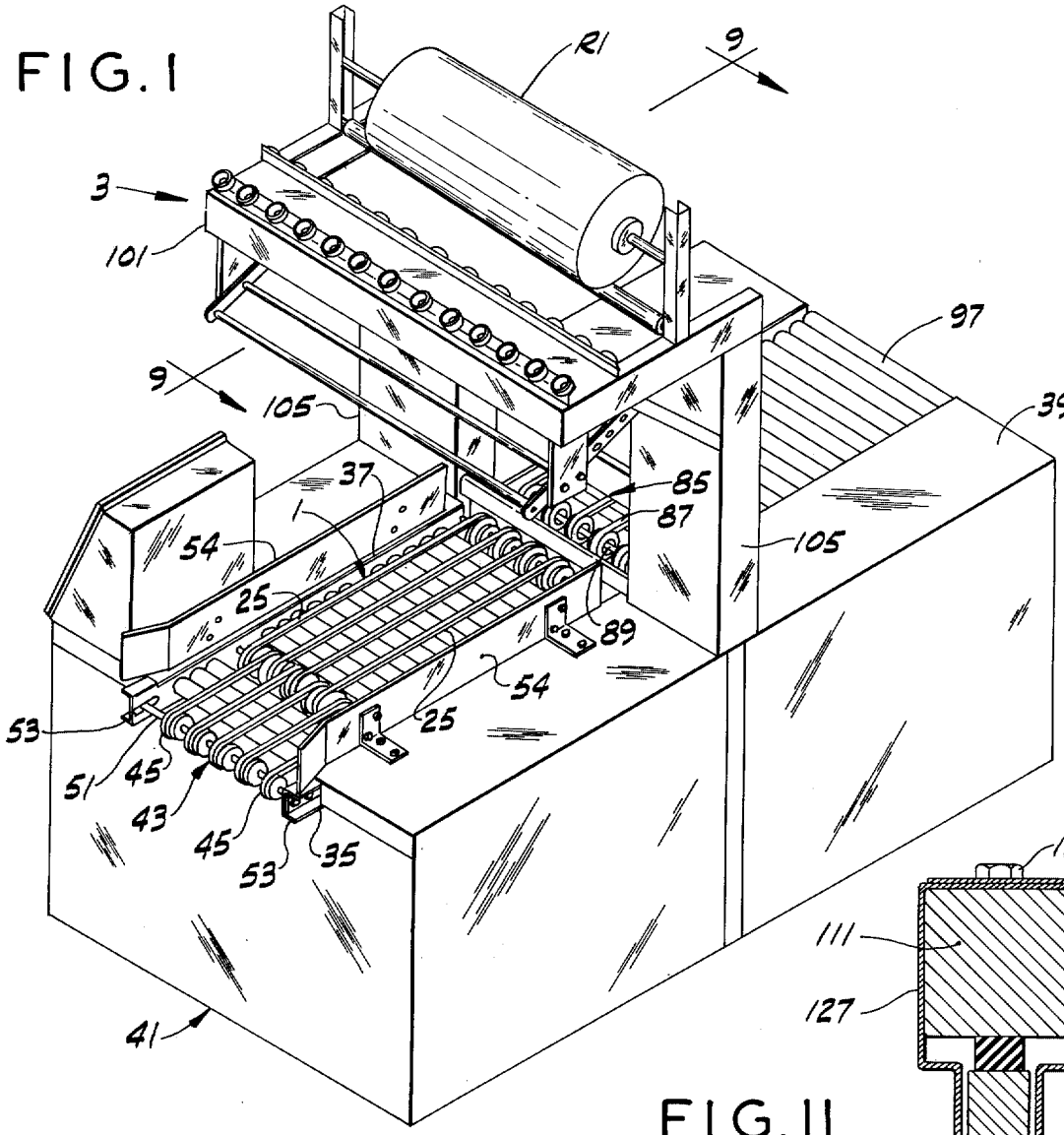
FIG. 1 is a perspective of a packaging apparatus embodying this invention.

Referring to the drawings, first more particularly to FIGS. 1 and 2, packaging apparatus embodying this invention is shown to comprise a main conveyor means indicated generally at 1 for feeding forward units U to be wrapped together with flexible packaging material as indicated generally at F for being wrapped about the units, with the units spaced apart in the direction of feed (which is toward the right as viewed in FIGS. 1 and 2). Means, as indicated generally at 3, is provided for supplying two webs F1 and F2 of the material, which is usually heat-sealable, heat-shrinkable plastic film, one of the webs to overlie and the other to underlie the units as they are fed forward. At 5 is generally indicated means for effecting intermittent operation of the feeding means intermittently to feed forward the units and packaging material with a dwell interval between successive feed cycles. At 7 is generally indicated means for forming a seal across the width of the packaging material between two successive units U during each dwell interval.

Figure 7:
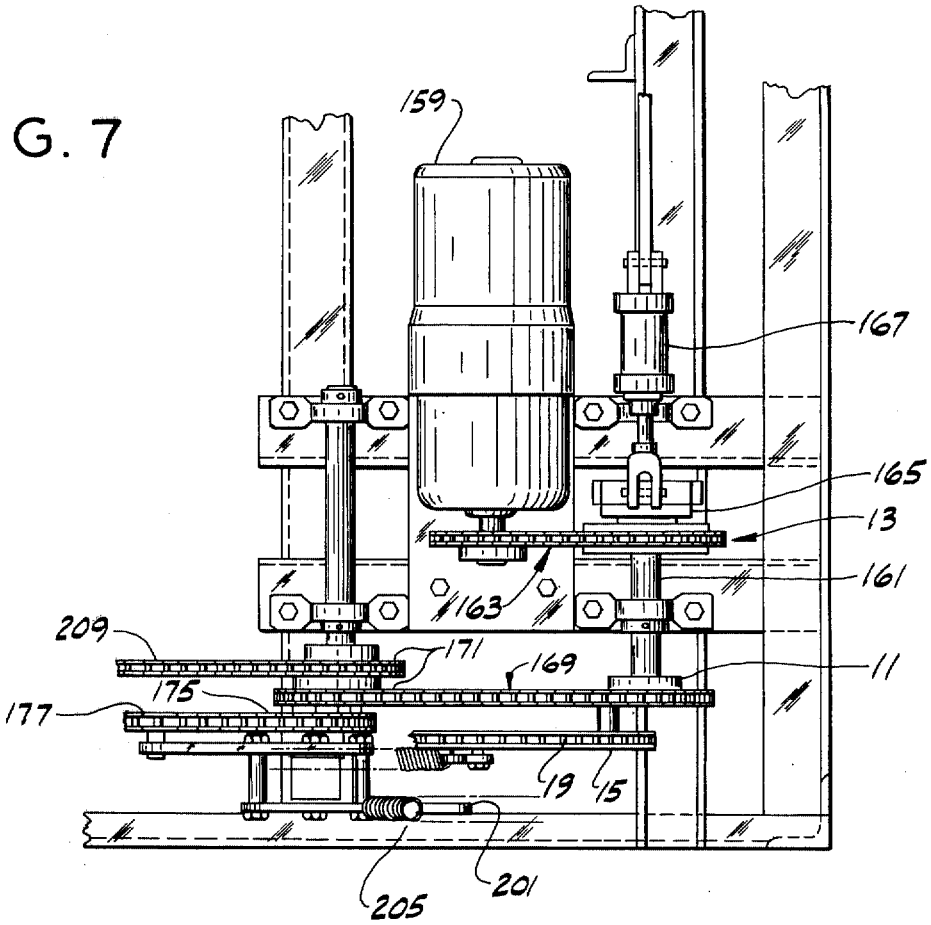
FIG. 7 is a plan of certain drive components.
Figure 10:
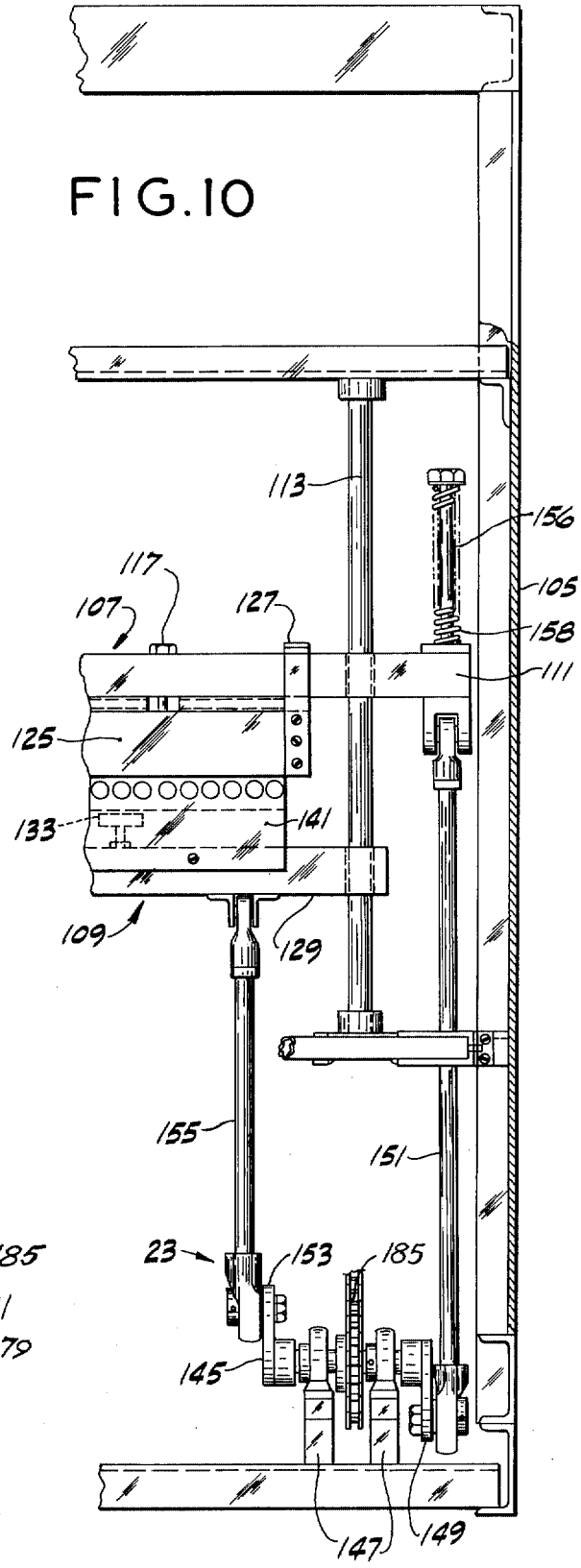
FIG. 10 is a partial transverse section on line 10—10 of FIG. 9 showing the sealing means.

In accordance with this invention, the means 5 for operating the conveyor means 1 for intermittently feeding units U forward comprises a chain and sprocket drive generally designated 9 including a crank 11 rotatable about a predetermined axis A1, with means 13 (see FIG. 7) for continuously rotating the crank in one direction about its said axis A1. Drive 9 further comprises a first sprocket 15 (which is a driving sprocket) secured to the crank 11 with its axis A2 offset from the crank axis A1 for rotation about the crank axis A1 without rotation about the sprocket axis A2, a second sprocket 17 (which is a driven sprocket), a chain 19 trained around the first and second sprockets 15 and 17, and means indicated generally at 21 for maintaining the chain generally taut around the sprockets. The first sprocket 15 acts to pull a reach 19a of the chain 19 in a forward direction to effect rotation of the second sprocket 17 in a forward direction for driving the conveyor or feed means 1 during a portion of a revolution of the first sprocket 15 about the crank axis A1, and to discontinue forward drive of the chain during another portion of the said revolution for a feed and dwell cycle of the main conveyor or feed means 1 during each revolution of the crank 11. At 23 (FIGS. 2 and 10) is generally indicated means for actuating the sealing means 7 during each dwell interval of means 1.

Figure 4:
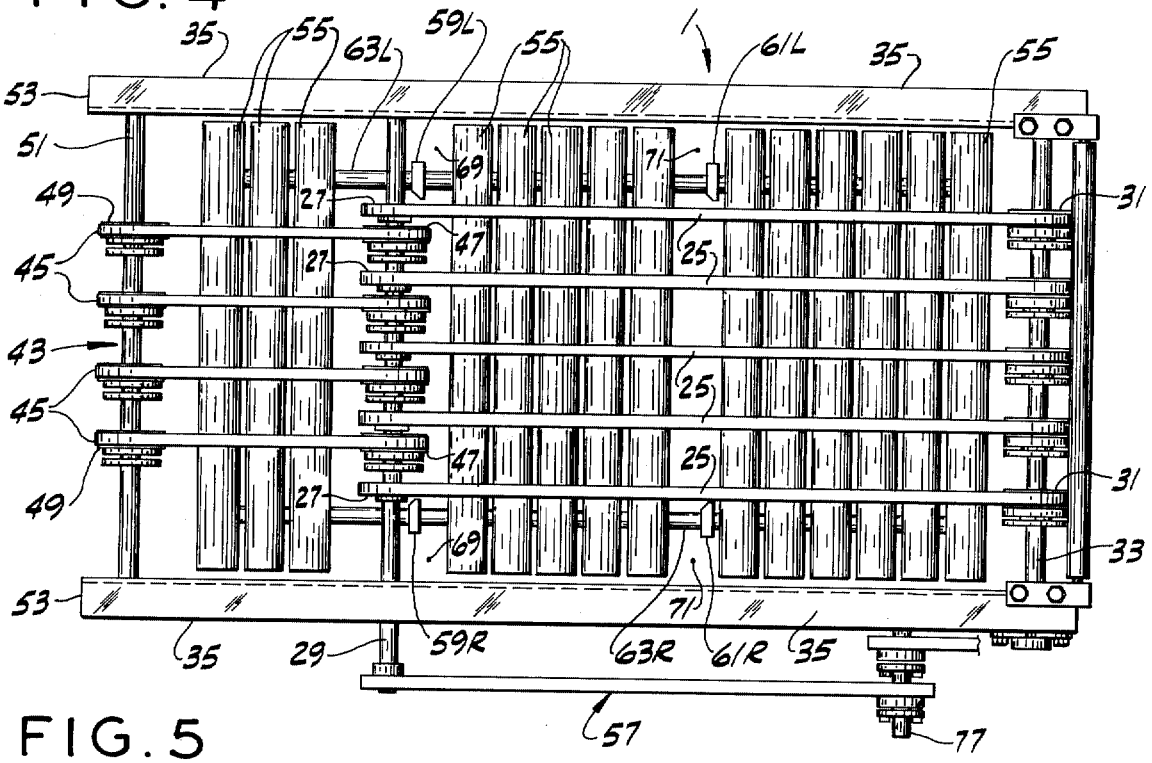
FIG. 4 is a plan of an infeed and main conveyor of the apparatus.
Figure 5:
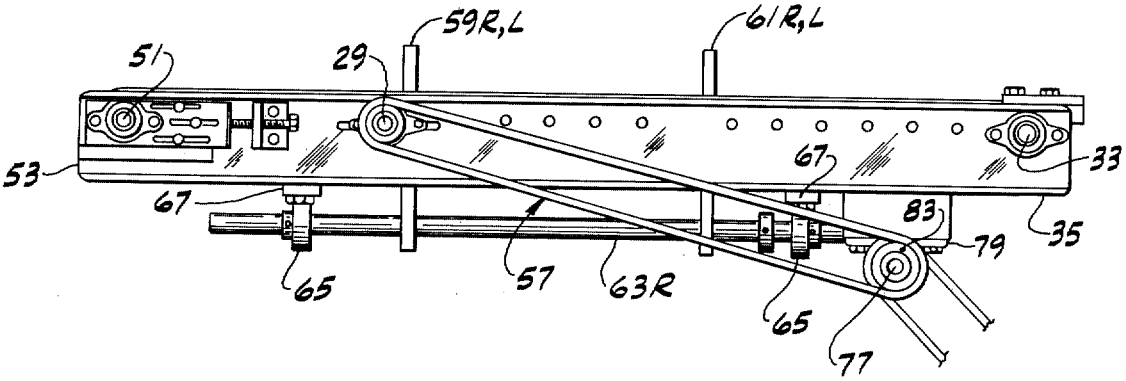
FIG. 5 is a side elevation of FIG. 4.

Means particularly, the main conveyor or feed means 1 is constituted by an endless belt conveyor having a horizontal upper reach for carrying units U forward in a predetermined horizontal path, this conveyor comprising a plurality of side-by-side laterally spaced-apart endless belts each designated 25 trained around pulleys 27 on a horizontal shaft 29 and pulleys 31 on a horizontal shaft 33. These shafts are journalled in side rails 35 at the sides of a relatively wide slot 37 extending from end to end of the top 39 of a base cabinet structure indicated generally at 41. At 43 is indicated an infeed conveyor for delivering units U to the main conveyor 1. This comprises a plurality of side-by-side laterally spaced-apart endless belts each designated 45 trained around pulleys 47 on shaft 29 and pulleys 49 on a horizontal shaft 51 journalled in rearward extensions 53 of the rails 35, the belts 45 having an upper reach generally flush with the upper reach of belts 25. The main conveyor 1 extends forward from the infeed conveyor to a point somewhat less than half way along the top 39 of the cabinet 41. Guides 54 for side-guiding units U are provided extending along the top 39 of the cabinet at opposite sides of the slot 37 for the conveyors 43 and 1. Rollers for supporting the upper reaches of belts 25 and 45 to keep them from sagging are indicated at 55 in FIG. 4.

Figure 6:
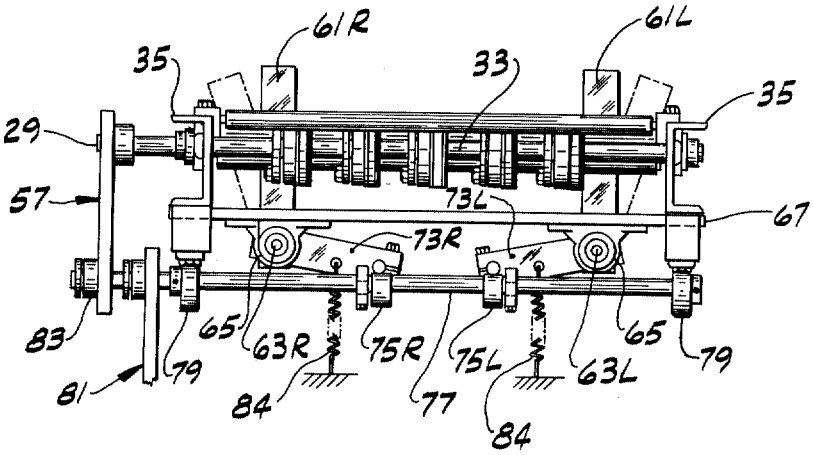
FIG. 6 is an end elevation of FIG. 5 as viewed from the right of FIGS. 4 and 5.

Pulleys 47 are keyed on shaft 29, but pulleys 27 idle on shaft 29 so that shaft 29 is a drive shaft for infeed conveyor 43 and an idle shaft for main conveyor 1. A chain and sprocket drive for continuously driving shaft 29 and hence continuously driving the infeed conveyor 43 is indicated at 57. Units U placed on and fed forward by the infeed conveyor 43 are adapted to be arrested as they reach the entry end of the main conveyor 1 by a pair of retractable stops 59L and 59R (referred to as the infeed stops) and units U on the main conveyor are adapted to be arrested about half way along the main conveyor by a second pair of retractable stops 61L and 61R (referred to as the main stops). Each of stops 59L and 61L is constituted by an arm extending upwardly above the upper reach of conveyor 1 on the outside of its left-hand belt 25 (left-hand as viewed in forward direction) from a left-hand rock shaft 63L. Each of stops 59R and 61R is constituted by an arm extending upwardly above the upper reach of conveyor 1 on the outside of its right-hand belt 25 from a right-hand rock shaft 63R. These rock shafts extend longitudinally of the apparatus with their axes horizontal underneath conveyor 1, being journalled in bearings such as indicated at 65 carried by cross bars 67 (see FIG. 6) extending between the bottoms of rails 35. Stops 59L and 59R are located immediately forward of shaft 29, suitable spaces such as indicated at 69 being provided to enable swinging of the stops between generally vertical stop positions (corresponding to those shown in solid lines in FIG. 6 for stops 61L and 61R) for arresting a unit U as it comes onto conveyor 1, and outwardly angled retracted positions (corresponding to those shown in phantom in FIG. 6 for stops 61L and 61R) for clearing unit U to be fed forward by conveyor 1. Stops 61L and 61R are located about half way along conveyor 1, suitable spaces such as indicated at 71 in FIG. 4 being provided to enable swinging of these stops between their generally vertical stop positions shown in solid lines in FIG. 6 for arresting a unit U half way along conveyor 1, and outwardly angled positions such as shown in phantom in FIG. 6 for clearing unit U to be fed forward by conveyor 1. Shafts 63L and 63R carry cam follower levers 73L and 73R engageable with cams 75L and 75R on a cam shaft 77 extending transversely underneath the rock shafts journalled in bearings 79. This cam shaft 77 is continuously driven via a chain and sprocket drive 81 and carries sprocket 83 of the drive 57 for the infeed conveyor 43. Thus, cam shaft 77, cams 75L, 75R and rock shafts 63L, 63R constitute means for retracting infeed stops 59L, 59R and main stops 61R, 61L in unison. The stops are positively opened (i.e., moved clear of the leading face of a unit) by their respective cams to feed a unit held by the stops forward for being wrapped. The stops are biased closed by springs, such as indicated at 84. Cams 75L, 75R and cam follower levers 73L, 73R are so structured as to release the stops for return to their closed positions after the conveyor and unit have moved forward only a short distance (e.g., 1 to 2 inches). The stops are freely journalled on shafts 63L, 63R and immediately upon the cams moving clear of their cam followers, the stops are biased by springs 84 toward their closed positions. If the unit has not moved clear of the stops, the stops will engage the sides of the unit, but will not prevent its movement with the conveyor. As the trailing end of the unit moves clear of the stops, the stops return to their fully closed position to arrest movement of the next successive unit. If the next successive unit is closely spaced relative to the unit being wrapped, the stops will prevent forward movement of the next unit and will release it in timed relation to the next operation of the conveyor. It will be noted that the stops will receive units spaced randomly or at spaced intervals and will feed these units forward one at a time for being wrapped in timed relation to operation of the seal forming means 7.

At 85 in FIGS. 1 and 2 is indicated an outfeed conveyor for feeding units U forward away from the main conveyor 1. This outfeed conveyor is a belt conveyor similar to the main conveyor except that it is relatively short. it comprises endless belts such as indicated at 87 in FIG. 1 trained around pulleys on a rearward shaft 89 and a forward shaft 91. The rearward or entry end of the outfeed conveyor 85 is spaced forward of the forward or exit end of the main conveyor 1, the space being indicated at 93 in FIG. 2. The previously mentioned second sprocket 17 of the chain and sprocket drive 9 is on shaft 91, whereby the outfeed conveyor is intermittently driven via drive 9, and a chain and sprocket drive 95 (see FIG. 2) is provided between the rear shaft 89 of conveyor 85 and the forward shaft 33 of conveyor 1 intermittently to drive the latter in unison with conveyor 85 via drive 9. Forward of belt conveyor 85 is an inclined roller conveyor 97 for delivery of enwrapped units from conveyor 85 off the top of the cabinet and, for example, to a shrink tunnel.

The packaging material supply means 3 comprises an upper roll holder 101 for holding a roll R1 of packaging material above the cabinet to provide the web F1 to overlie the units U as they are fed forward by the main conveyor 1 onto the outfeed conveyor 85 and a lower roll holder 103 in the cabinet 41 for holding a roll R2 of packaging material to provide the web F2 to underlie the units as they are fed forward by the main conveyor onto the outfeed conveyor. The upper holder is mounted on columns 105 extending upwardly from the top of the cabinet at opposite sides of the slot 37 in a plane between the exit end of conveyor 1 and the entry end of conveyor 85. These columns also serve as supports for certain components of the sealing means 7 as will be described.

Figure 11:
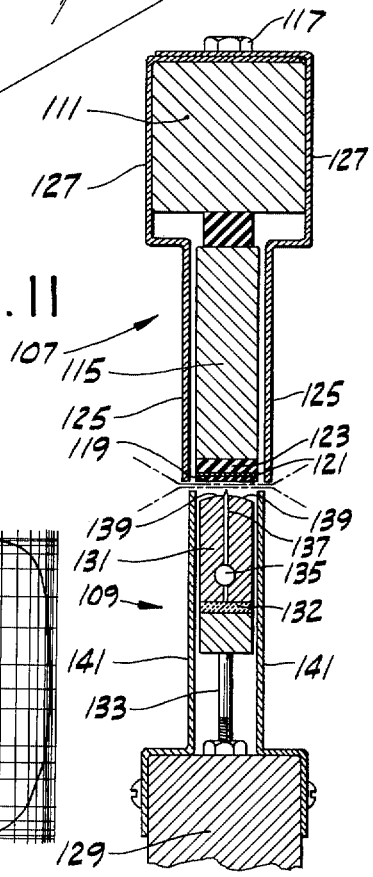
FIG. 11 (sheet 1) [1)] is an enlarged fragment of FIG. 9.

The sealing means 7 comprises upper and lower horizontal bar assemblies 107 and 109 which extend transversely of the apparatus between the two columns and which are vertically movable toward and away from one another in a vertical transverse plane of the apparatus in the aforesaid space 93 between the exit end of conveyor 1 and the entry end of conveyor 85. The upper assembly comprises a horizontal bar 111 extending transversely of the apparatus mounted for vertical sliding movement on a pair of vertical guide rods 113 at opposite sides of the apparatus, and a sealing member or an anvil 115 carried by bolts 117 at the bottom of the bar 111. The anvil 115 has a silicone rubber bottom facing 119 backed by a thin metal strip 121 (e.g., a brass strip) and a rubber strip 123 (see FIG. 11). A pair of sheet metal shield plates 125 extend down on opposite sides of the anvil and have connecting straps 127 extending around the bar 111. The plates 125 with their straps 127 are movable vertically relative to the bar 111 and anvil 115, the plates normally occupying a lowered position relative to the anvil wherein their lower margins project down below the anvil bottom facing 119. The plates 125 with their connecting straps 127 are adapted to rise relative to the bar 111 and anvil 115 if they encounter any obstruction. The lower assembly 109 comprises a lower horizontal bar 129 extending transversely of the apparatus mounted for vertical sliding movement on rods 113 and a sealing member constituted by a sealing bar 131 mounted on asbestos pads 132 on top of adjustment jacks 133 on top of bar 129. The sealing bar 131 has an electrical resistance heater 135 therein for heating it to sealing temperature and a central cutting blade 137, the sealing faces of the bar on opposite sides of the blade being indicated at 139 in FIG. 11. A pair of sheet metal shield plates 141 extend up from bar 129 on opposite sides of the sealing bar 131, the spacing of these plates being such that they are adapted to enter between plates 125 and the sides of the anvil 115.

It will be understood that upon operation of sealing means 7 anvil 115 and sealing bar 131 are brought into engagement with one another with webs F1 and F2 therebetween to form seals S1 and S2 and to sever the webs as shown in FIGS. 2A and 2B. As the anvil and sealing bar are brought into engagement with one another, blade 137 deforms bottom facing 119 to sever the film and sealing faces 139 resiliently bear against the bottom facing with the film therebetween to form seals S1 and S2. After repeated operations, blade 137 may cut into facing 119. In the event this occurs, the blade will contact metal strip 121 to sever the film. Because strip 21 is resiliently backed by rubber strip 123, the strip is not a rigid anvil and does not damage the blade. The metal strip 121 prevents cutting of rubber strip 123. Thus, repeated operation of the anvil and sealing bar results in well-formed seals and clean severing of the film without replacement of facing 119.

Figure 8:
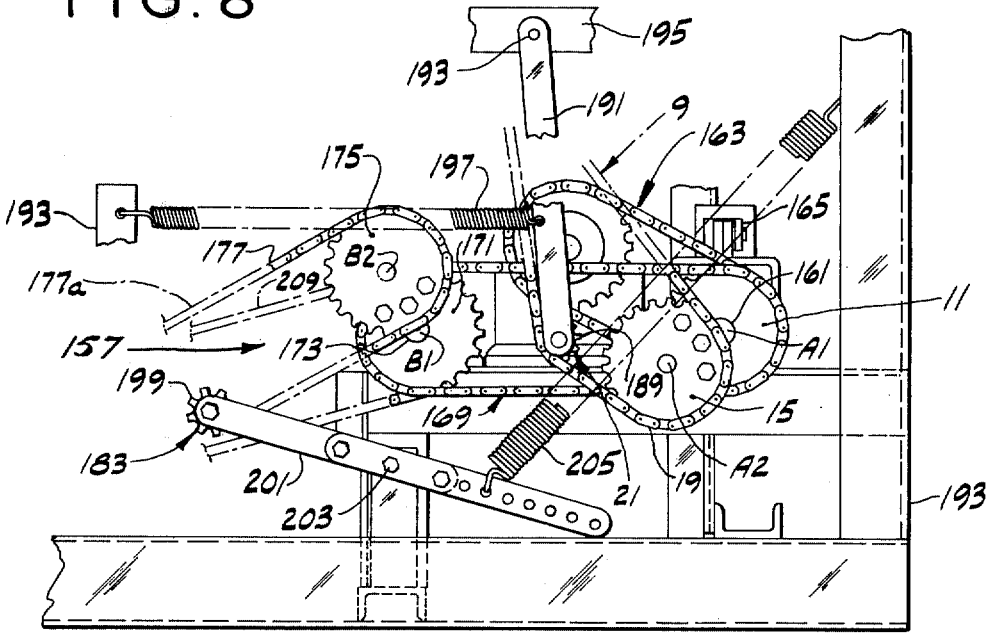
FIG. 8 is a side elevation of FIG. 7.
Figure 9:
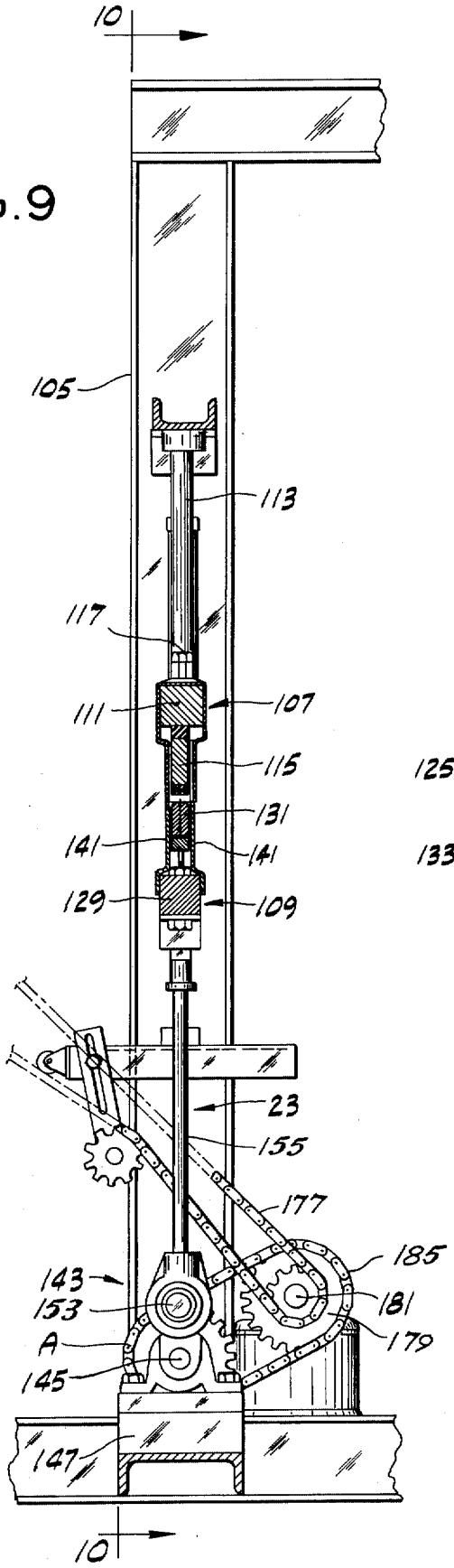
FIG. 9 is a longitudinal vertical section on line 9—9 of FIG. 1 showing the sealing means of the apparatus.

At 143 (FIGS. 3 and 9) is generally indicated means for moving the anvil 115 down and the seal bar 131 up from an open retracted position (wherein the anvil is raised and the seal bar is lowered) into engagement with one another for sealing and severing the film, and then moving the anvil back up and the seal bar back down to their respective retracted positions. This means comprises a pair of crankshafts 145, one at each side of the apparatus, each journalled in bearings as indicated at 147 and having a first crank 149 at its outer end connected by a link 151 to the respective end of the carrier bar 111 for the anvil 115, and a second crank 153 at its inner end connected by a link 155 to the carrier bar 129 for the seal bar 131, with these cranks 180° out of phase. A drive 157 (see FIGS. 2 and 8) similar to drive 9 is provided for intermittently driving the two crankshafts 145 through a one-revolution cycle.

The throws of cranks 149 and 153 are greater than the spacing between the top of blade 137 and backing 119 when the sealing bar 109 and anvil 107 are in their open position. Each link 151 is connected to bar 111 of anvil 107 by means of an overtravel linkage including a rod 156 free to slide vertically relative to bar 111 and a compression coil spring 158 surrounding the rod and interposed between the upper edge of bar 111 and a nut threaded on rod 156. Thus as cranks 153 and 149 pass through their bottom and top dead-center positions, respectively, the anvil and the sealing bar are brought into engagement and held in engagement as the cranks continue to rotate. Springs 158 permit overtravel of the cranks and thus provide a dwell during which sealing surfaces 139 may perfect seals S1 and S2.

The input of drives 9 and 157 is from an electric motor 159 (FIG. 7) which runs continuously while the apparatus is in operation. At 161 (FIGS. 7 and 8) is indicated a shaft carrying the crank 11 which is continuously driven by the motor via a chain and sprocket drive 163 and a safety clutch 65 controlled by an air cylinder 167. The clutch is normally engaged for continuous operation of the shaft 161 and crank 11; it is adapted to be disengaged as a safety feature if the safety shield plates 125 should encounter an obstruction via the resultant upward movement of the safety shield plates 125 relative to the anvil 115 and its carrier bar 111 and resultant actuation of a safety switch (not shown)

by the safety shield plates 125 to actuate a valve (not shown) to operate air cylinder 167 to disengage the clutch 65. As previously described, crank 11 carries the first sprocket 15 of the drive 9 for operating the conveyors 85 and 1. Crank 11 is itself a sprocket functioning as the drive sprocket of a second chain and sprocket drive 169 including a driven sprocket 171 on a shaft 173. Sprocket 171 (rotatable about the axis B1 of shaft 173) functions as a crank (like sprocket 11) and has a sprocket 175 (which is a driving sprocket and which may be referred to as the third sprocket like sprocket 15) secured thereto for rotation therewith, with the axis B2 of sprocket 175 off-set from the axis B1 of the sprocket [on] or crank 171. Sprocket 175 does not rotate on its own axis B2. A chain 177 is trained around sprocket 175 and a sprocket 179 (which may be referred to as the fourth sprocket) on a countershaft 181. Means indicated generally at 183 is provided for maintaining chain 177 generally taut around the sprockets 175 and 179. The driving sprocket 175 acts to pull a reach 177a of the chain 177 in a predetermined direction to effect rotation of the driven sprocket 179 and countershaft 181 (sprocket 179 being keyed thereto) and countershaft 181 has chain and sprocket drives 185 the chains of which are trained around sprockets 187 on crankshafts 145 to operate (close and open) the anvil and seal bar 115 and 131 during a portion of the revolution of the driving sprocket 175 about axis B1, and to discontinue the drive of the chain 177 during another portion of the said revolution for a dwell of the anvil and seal bars in their open position.

The length of the chain 19 of the drive 9 corresponds generally to the length of chain wrap needed for the condition when the axis A2 of the sprocket 15 is in dead-center position (not shown) in line with axis A1 and the axis of shaft 91 and on the side of axis A1 away from shaft 91 (referred to as the long dead-center position). As sprocket 15 rotates around with crank 11 (clockwise as viewed in FIGS. 2 and 8) from this dead-center position to its opposite dead-center position (referred to as its short dead-center position) the length of wrap decreases, and means 21 takes up the slack of the chain to maintain it taut. As shown, means 21 comprises a slack take-up sprocket 189 on a take-up arm 191 pivoted at 193 on part of frame 195 of the apparatus and biased by a coil tension spring 197 to pull the chain taut. Similarly, the length of chain 177 corresponds generally to the length of chain wrap needed for the condition when the axis B2 of sprocket 175 is in its long dead-center position in line with axis B1 and the axis of countershaft 181 and on the side of axis B1 away from the countershaft. As sprocket 175 rotates around with crank 171 (clockwise as viewed in FIGS. 2 and 8) from this dead-center position to its opposite or short dead-center position, the length of wrap decreases, and means 183 takes up the slack of the chain 177 tc maintain it taut. As shown, means 183 comprises a slack take-up sprocket 199 on a take-up arm 210 pivoted at 203 on frame 195 and biased by a coil tension spring 205 to pull the chain taut.

The countershaft 181 has a double sprocket cluster 207 idling thereon. This is driven by a chain and sprocket drive 209 from shaft 173 and drives cam shaft 77 via the chain and sprocket drive 81.

It will be noted that the pitch circles of sprockets 15 and 175 are coincident with axes A1 and B1, respectively. This provides for dwell time of the conveyor 25 and sealing means 7 when the sprockets are in the positions shown in FIG. 8 (i.e., when the sprockets are half way between their short and long dead-center positions, or more particularly when a line passing through the axes A1 and A2 or through axes B1 and B2 is perpendicular to a respective line through A1 and shaft 91 and B1 and shaft 181).

In operation, with motor 159 running continuously, sprocket 11 is driven continuously. It drives sprocket 171 continuously via the chain drive 169. Sprocket 171 drives sprocket cluster 207 continuously via drive 209. Cluster 207 drives shaft 77 continuously via drive 81. Shaft 77 drives the infeed conveyor 43 continuously via drive 57. With shaft 77 operating continuously cams 75L and 75R act via levers 73L and 73R to swing stops 61L and 61R between their vertical stop positions and their outwardly angled retracted positions shown in solid lines and in phantom in FIG. 6 to release a unit for being wrapped.

Crank 11 rotates continuously (clockwise as viewed in FIGS. 2 and 8) around its axis A1 and effects rotation of the stated first sprocket 15 around axis A1 without rotation of sprocket 15 around its own axis A2. As sprocket 15 rotates from it position shown in FIG. 2, it pulls reach 19a of the chain 19 to drive the second sprocket 17 in forward direction (clockwise as viewed in FIG. 2) to drive the outfeed conveyor in forward direction. This effects driving in forward direction of the main conveyor 1 via the conveyor interconnecting drive 95. As sprocket 15 rotates around back to its position shown in FIG. 2, the conveyor is gradually decelerated to a stop, the chain 19 being maintained taut by the slack take-up sprocket 189 (see FIG. 8).

Thus, the conveyors 1 and 85 dwell when sprocket 15 is in its FIG. 2 position; hence this position is referred to as a dwell position.

Sprocket 171 rotates continuously (clockwise as viewed in FIGS. 2 and 8) around its axis B1 in unison with crank 11 and effects rotation of the third sprocket 175 around axis B1 without rotation of sprocket 174 around its own axis B2. As sprocket 171 rotates around from its position shown in FIG. 2, it pulls reach 177a of chain 177 to drive the fourth sprocket 179 and countershaft 181 in forward direction (clockwise as viewed in FIGS. 2 and 9). It will be noted that with sprocket 175 in its position as shown in FIG. 2, the seal bar 131 and anvil 115 are closed and momentarily remain closed for a time sufficient to complete the seal, this momentary dwell resulting from operation of the above-mentioned overtravel linkage. Countershaft 181, via drive 185, drives crank shaft 145 through a revolution in clockwise direction as viewed in FIG. 9, and this effects closing and opening of the seal bar 131 and anvil 115. The drives 5 and 157 are so phased relative to one another that the closing movement of the seal bar and anvil starts somewhat before the stopping of conveyors 1 and 85 and is completed during the dwell of the conveyors with both the conveyors and the seal bar and anvil dwelling simultaneously for a short period of time with their respective sprockets 15 and 175 at their dwell and momentary dwell positions, respectively. Then the opening movement of the seal bar and anvil starts during the dwell of the conveyors 1 and 85 and is completed somewhat after the start of the conveyors. It will be understood that the seal bar and anvil are well clear of the suit U when movement of conveyors 1 and 85 is initiated to convey a unit past films F1 and F2 for having the film wrapped therearound. It will be further understood that during certain portions of each cycle, both the conveyors and the anvil and heat-seal bar move simultaneously, and that the heat-seal bars remain stationary in their retracted or clear position during only a portion of each packaging cycle (this portion of the cycle corresponding to the time when units U are conveyed forward by the conveyors for having the film wrapped therearound). It will also be noted that the above-mentioned over-travel linkages (including rods 156 and springs 158) interconnecting bar 111 with cranks 149 and 153 allow the seal bar and the anvil to come together in sealing relation with the film and remain in sealing contact with the film for heat-sealing and severing of the film during continued rotation of the crank.

Following the progress of a unit U through the apparatus, the unit U is first placed on the infeed conveyor 43 (which runs continuously) and is fed forward thereby against the infeed stops 59L and 59R. It is arrested by these stops in the position indicated at P1 in FIG. 2 for an interval until they open and allow the unit to pass onto the main conveyor 1. This initial infeed and arrest provide an initial positioning of the unit at P1 for its travel through the apparatus. When the stops 59L and 59R open, the main conveyor 1 is running and feeds the unit forward. As it is fed forward by the main conveyor, stops 59L and 59R close to arrest the next unit at P1 and the main stops 61L and 61R (which operate in unison with stops 59L and 59R) also close to arrest the unit at position P2 shown in FIG. 2, for a final positioning of the unit relative to the seal forming means 7 for subsequent travel of the unit through means 7. The main conveyor comes to a stop shortly after the unit engages the stops 61L and 61R and is arrested at P2. The main stops 61L and 61R then open, and the main conveyor 1 starts running, feeding the unit U forward to a position P3 somewhat upstream from the sealing means 7 and stops. The stops, being spring-biased closed, are adapted to engage the sides of a unit and remain in engagement with the sides of a unit until the unit has cleared the stops, whereupon they may close to arrest the next unit regardless of the spacing between successive units.

After a unit U has reached position P3, on the next operation of the main conveyor 1, the unit is fed forward from position P3 to position P4 on the outfeed conveyor 85. As shown in FIG. 2A, in travelling from position P3 to position P4, the unit engages the vertical reach R of film which extends vertically in the space 93 between the exit end of conveyor 1 and the entry end of conveyor 85, and which is constituted by a downwardly extending end portion of film F1 and an upwardly extending end portion of film F2, the ends of these two films being joined at a heat seal such as indicated at S1 as a result of the previous sealing operation. The unit U, moving forward to position P4, pushes the film forward as shown in FIG. 2B, as a result of which the upper web F1 becomes draped over the unit and the lower web F2 becomes draped under the unit (see FIG. 2). The seal bar assemblies 107 and 109 then close on the webs behind the unit U as shown in FIG. 2 and effect heat-sealing together of the two webs and severing of the webs through the seal so as to provide a trailing seal S2 for the film draped around the unit and a seal S1 constituting the leading seal for the next sealing operation. The seal bar and anvil close to form the seals when the units and film are at a dead stop, and this is highly advantageous for forming good seals in that there is no stress on the seals as they are formed.

The seal bar and anvil then open, and conveyors 1 and 85 start up and operate through another cycle. Conveyor 85 feeds the enwrapped unit U from position P4 on to the roller conveyor 97, which may deliver it to a shrink tunnel (not shown). Conveyor 1 brings another unit through from P3 to P4 to be enwrapped and sealed.

Figure 12:
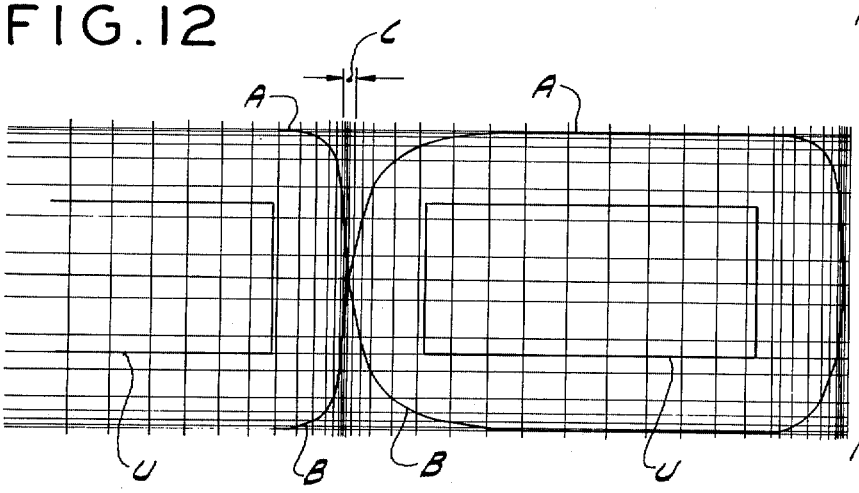
FIG. 12 is a kinematic diagram illustrating acceleration and deceleration characteristics of certain parts of the apparatus.

FIG. 12 diagrammatically illustrates the kinematics of the apparatus, the horizontal lines therein indicating the acceleration and deceleration of the anvil 115 and the seal bar 131, and the vertical lines therein indicating the acceleration and deceleration of the intermittently operating conveyors 1 and 85. Line A depicts the action of the anvil 115 and line B depicts the action of the seal bar 131 in one cycle of operation, as related to the unit depicted at U. The interval of time in which the film is sealed (to form seals S2 and S1) is indicated at C. The acceleration and deceleration characteristics of the conveyors 1 and 85 are such that the starting and stopping of the conveyors occurs in a very smooth manner, making it possible to handle products of low stability (e.g., filled bags standing upright) without disorientation (e.g., without tipping over) at practical speeds, and at the same time making for longer [like] *life,* low maintenance requirements, and reliability.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Packaging apparatus comprising means for feeding forward units to be wrapped and flexible packaging material for wrapping the units, with the units spaced apart in the direction of feed, means for effecting intermittent operation of the feeding means intermittently to feed forward the units and the packaging material, with a dwell interval between successive feed cycles, and means for forming a seal across the width of the material between two successive units during each dwell interval, wherein said means for operating the feeding means comprises a chain and sprocket drive including a crank rotatable about a predetermined axis, means for continuously rotating the crank in one direction about its said axis, a first sprocket secured to the crank with the axis of said first sprocket offset from the crank axis for rotation of said first sprocket about the crank axis without rotation of said first sprocket about its own axis, a second sprocket connected to said feeding means, a chain trained around said first and second sprockets, said first sprocket acting to pull a reach of the chain in a forward direction to effect rotation of the second sprocket in a forward direction for driving said feed means during a first portion of a revolution of said first sprocket about the crank axis, and to discontinue [froward] *forward* drive of the chain during a second portion of said revolution for a feed and dwell of the feed means during each revolution of the crank, means for maintaining the chain relatively taut around said sprockets, and means driven in timed relation to said first sprocket for operating said seal forming means to form a seal as the first sprocket rotates through said second portion of a revolution.

2. Packaging apparatus as set forth in claim 1 wherein the means for forming a seal comprises at least one sealing member movable between an open and a closed position, and the means for operating said seal forming means comprises means for moving said sealing member from its open to its closed position to form a seal across the width of the material between two successive units during each dwell interval of said feeding means and then back to open position comprising a second chain and sprocket drive including a second crank rotatable about a predetermined axis, means for continuously rotating said second crank in one direction about its axis in timed relation with said first crank, a third sprocket secured to said second crank with the axis of said third sprocket offset from the axis of said second crank for rotation of said third sprocket about the axis of said second crank without rotation of the said third sprocket about its own axis, a fourth sprocket connected to said operating means, a second chain trained around said third and fourth sprockets, said third sprocket acting to pull a reach of said second chain in one direction to effect rotation of said fourth sprocket through a cycle for moving said sealing member from its open position to its closed position and then back to its open position, and means for maintaining said second chain relatively taut around said third and fourth sprockets.

3. Packaging apparatus as set forth in claim 2 wherein the means for forming a seal comprises a sealing bar and an anvil movable toward one another from an open position to a closed position engaging the material for forming a seal and then back to open position, said operating means operating said sealing bar and anvil from said fourth sprocket.

4. Packaging apparatus as set forth in claim 2 wherein said feeding means comprises conveyor means for intermittently feeding forward the units to be wrapped one after another in a generally horizontal path, said apparatus having means for supplying two webs of flexible heat-sealable plastic film one to underlie and the other to overlie the units as they are fed forward, said conveyor means being intermittently driven by the first sprocket via the first-mentioned chain and the second sprocket.

5. Packaging apparatus as set forth in claim 4 wherein said conveyor means comprises a main conveyor on the upstream side of said seal forming means and an outfeed conveyor on the downstream side of said seal forming means, both intermittently driven by said first sprocket via the first-mentioned chain and the second sprocket.

6. Packaging apparatus as set forth in claim 5 having an infeed conveyor for delivering units to the main conveyor, means for continuously driving the infeed conveyor, retractable infeed stop means for engagement by a unit being conveyed forward by said infeed conveyor to arrest it in a preliminary position as it comes onto the main conveyor, main retractable stop means for engagement by a unit being conveyed forward by said main conveyor to arrest it in another predetermined position upstream from the seal forming means, and means for retracting said infeed and main stop means in unison for feeding forward units received randomly or at spaced intervals on the infeed conveyor one at a time for being wrapped in timed relation to operation of said seal forming means.

7. Packaging apparatus as set forth in claim 5 having a sealing bar and an anvil movable in a vertical transverse plane between the exit end of the main conveyor and the entry end of the outfeed conveyor from an open retracted position wherein the bar and anvil are spaced for passage therebetween of a unit to a closed position engaging the film for forming a seal and then back to open position, said sealing bar and anvil being operated via said fourth sprocket in a cycle involving closing and opening of said bar and anvil on each revolution of said third sprocket about the axis of the second crank, and mean whereby, at the start of a cycle, one web of film extends downwardly and the other extends upwardly in a vertical transverse plane behind the plane of the bar and anvil with the ends of the webs heat-sealed together.

8. Apparatus as set forth in claim 2 wherein said first and second cranks are constituted by sprockets and are interconnected by a chain for rotation therein in unison with the said first and third sprockets out of phase for operation of the sealing member during the dwell between successive feed cycles.

*9. Packaging apparatus comprising means for feeding forward units to be wrapped and flexible packaging material for wrapping the units, with the units spaced apart in the direction of feed, means for effecting intermittent operation of the feeding means intermittently to feed forward the units and the packaging material, with a dwell interval between successive feed cycles, and means for forming a seal across the width of the material between two successive units during each dwell interval, wherein said means for operating the feeding means comprises a chain and sprocket drive including a crank rotatable about a predetermined axis, means for rotating the crank in one direction about its said axis, a first sprocket secured to the crank with the axis of said first sprocket offset from the crank axis for rotation of said first sprocket about the crank axis without rotation of said first sprocket about its own axis, a second sprocket connected to said feeding means, a chain trained around said first and second sprockets, said first sprocket acting to pull a reach of the chain in a forward direction to effect rotation of the second sprocket in a forward direction for driving said feed means during a first portion of a revolution of said first sprocket about the crank axis, and to discontinue forward drive of the chain during a second portion of said revolution for a feed and dwell of the feed means during each revolution of the crank, means for maintaining the chain relatively taut around said sprockets, and means driven in timed relation to said first sprocket for operating said seal forming means to form a seal as the first sprocket rotates through said second portion of a revolution.*

* * * * *